(12) United States Patent
Wang et al.

(10) Patent No.: US 7,765,592 B2
(45) Date of Patent: Jul. 27, 2010

(54) CHANGED FILE IDENTIFICATION, SOFTWARE CONFLICT RESOLUTION AND UNWANTED FILE REMOVAL

(75) Inventors: Yi-Min Wang, Bellevue, WA (US); Aaron R. Johnson, Lynnwood, WA (US); David C. Ladd, Redmond, WA (US); Roussi A. Roussev, Bellevue, WA (US); Chad E. Verbowski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1530 days.

(21) Appl. No.: 10/830,334

(22) Filed: Apr. 22, 2004

(65) Prior Publication Data

US 2005/0155031 A1 Jul. 14, 2005

Related U.S. Application Data

(60) Provisional application No. 60/535,312, filed on Jan. 9, 2004.

(51) Int. Cl.
*G06F 21/00* (2006.01)
*G06F 12/14* (2006.01)
(52) U.S. Cl. .................. 726/22; 713/187; 714/15
(58) Field of Classification Search .............. 726/22; 713/187
See application file for complete search history.

(56) References Cited

U.S. PATENT DOCUMENTS 6,338,149 B1 * 1/2002 Ciccone et al. ............... 714/38
2003/0105744 A1 * 6/2003 McKeeth ....................... 707/3

OTHER PUBLICATIONS

Lavasoft "Getting Started with Ad-aware" Sep. 25, 2002 http://web.archive.org/web/20021014125056/www.lavasoft.de/manual.html.*
Y. M. Wang, C. Verbowski, and D. R. Simon, "Persistent-state Checkpoint Comparison for Troubleshooting Configuration Failures," in *Proc. Int. Conf. on Dependable Systems and Networks (DSN)*, 2003.
Y. M. Wang, C. Verbowski, J. Dunagan, Y. Chen, Y. Chun, H. J. Wang, and Z. Zhang, "STRIDER: A Black-box, State-based Approach to Change and Configuration Management and Support," in *Proc. Usenix Large Installation Systems Administration (LISA) Conference*, pp. 159-171, Oct. 2003.
B. Harder, Windows XP System Restore, [web page] http://msdn.microsoft.com/library/default.asp?url=/library/en-us/dnwxp/html/windowsxpsystemrestore.asp, Apr. 2001, 10 pp. [accessed Apr. 15, 2004].

(Continued)

*Primary Examiner*—Gilberto Barron, Jr.
*Assistant Examiner*—Cordelia Zecher
(74) *Attorney, Agent, or Firm*—Lee & Hayes, PLLC

(57) ABSTRACT

As computer programs grow more complex, extensible, and connected, it becomes increasingly difficult for users to understand what has changed on their machines and what impact those changes have. An embodiment of the invention is described via a software tool, called AskStrider, that answers those questions by correlating volatile process information with persistent-state context information and change history. AskStrider scans a system for active components, matches them against a change log to identify recently updated and hence more interesting state, and searches for context information to help users understand the changes. Several real-world cases are provided to demonstrate the effectiveness of using AskStrider to quickly identify the presence of unwanted software, to determine if a software patch is potentially breaking an application, and to detect lingering components left over from an unclean uninstallation.

19 Claims, 8 Drawing Sheets

OTHER PUBLICATIONS

Microsoft Baseline Security Analyzer, [web page] http://www.microsoft.com/technet/treeview/default.asp?url=/technet/security/tools/mbsahome.asp , Feb. 20, 2004, 3 pp. [accessed Apr. 15, 2004].

System Restore Monitored File Extensions, [web page] http://msdn.microsoft.com/library/default.asp?url=/library/en-us/sr/sr/monitored_file_extensions.asp, 3 pp. [accessed Apr. 15, 2004].

LavaSoft, Ad-Aware spyware removal program, [web page] http://www.lavasoft.de/software/adaware/ 2 pp. [accessed Apr. 15, 2004].

SoftActivity Activity Logger, [web page] http://www.softactivity.com 3 pp. [accessed Apr. 15, 2004].

Precision Time, [web page] http://www.precision-time.com [accessed Apr. 15, 2004].

iOpus ActMon Computer & Internet Monitoring Software, [web page] http://www.iopus.com/actmon/index.html 3 pp.[accessed Apr. 15, 2004].

* cited by examiner

CHANGED FILE IDENTIFICATION, SOFTWARE CONFLICT RESOLUTION AND UNWANTED FILE REMOVAL

CROSS-REFERENCE TO RELATED APPLICATION

The present application claims the benefit of Wang et al., U.S. Provisional Patent Application No. 60/535,312 entitled, "Changed File Identification, Software Conflict Resolution And Unwanted File Removal", filed on Jan. 9, 2004, which is hereby incorporated by reference in its entirety.

FIELD OF THE INVENTION

This invention pertains generally to the field of computer software and operating systems and more particularly to identifying problematic software on a computer system.

BACKGROUND OF THE INVENTION

As computer programs grow more complex, extensible, and connected, it becomes increasingly difficult for users to understand what is causing their machines to behave differently. Network connectivity allows programs to be automatically downloaded and installed. Browser extensibility allows components to be hooked into the browser in sophisticated ways that change users' browsing experience. Complexity of the programs and their interactions are often beyond users' comprehension and makes troubleshooting a very difficult task.

Today, problems due to unwanted software installations through "drive-by downloads" are becoming a top generator of support calls. Such software can be downloaded and installed without any consent from the user, if she visits a rogue Web site with the browser security setting set too low. Or, a user may unintentionally give consent to such downloads when she installs other free software packages, obtains electronic coupons, or clicks on the "OK" button without reading the fine print.

Unwanted software installations can cause a wide range of problems. "Ad-ware" that generates pop-up ads and browser plug-ins that add toolbars/menu items or replace the default search engines can be quite annoying. "Spyware" that monitors users' browsing patterns and/or occasionally hijacks users' browser sessions to redirect them to sponsor sites raises privacy concerns; such concerns become even more serious when "snoopware" is used to record keystrokes and screenshots. Finally, viruses, worms, or backdoors may be installed to cause significant security issues.

Software patching is another major source of changes to users' machines. Several serious outbreaks of viruses and worms that exploited security vulnerabilities of operating systems software have demonstrated the importance of timely application of security patches. One of the reasons that users delay applying patches is that they are concerned about the patched programs potentially breaking their existing applications. This is particularly true in the corporate desktop environments and in the data center environments running mission-critical server applications. When an application stops working after a few patches are applied, it is in general very difficult to determine if any of the patches are at fault.

Incomplete removal of software packages is another common problem that causes user frustration. Due to the non-transactional nature of most uninstallation programs, a subset of components may be left over from a supposedly removed package and cause inconsistency or confusion. Some spyware may intentionally leave components running, even after uninstallation, so that they can continue to monitor user activities. In general, it is difficult for the users to determine if there are any left-over components from an unclean application removal still running on their machines.

PC users on the family of MICROSOFT WINDOWS operating systems currently use an Add/Remove Programs (ARP) applet inside the Control Panel to find out what software are installed on their machines and to remove individual software packages. Today's ARP has at least four problems: (1) it does not provide the option of sorting the software packages according to their installation dates; (2) it displays only those "good-citizen" software packages that do not mind letting the users know that they are installed and provide a "Remove" option; (3) it relies on the set of sub-keys under a "Uninstall" Registry key. If a program's "Remove" option simply deletes its key under the "Uninstall" key and leaves its actual software installed and running, the APR applet will incorrectly show to the user that the software has been removed; (4) a software package might have been installed by another software and not installed directly by the user; so the user does not recognize the former. Today's ARP applet does not inform the user of such linkage.

BRIEF SUMMARY OF THE INVENTION

Methods and systems are provided for automatically identifying changes to a computer system. In one aspect of the invention, a method comprises scanning the computer system for active software components, investigating file change histories for the active software components to find recently updated files, and searching a local file system for context information for the recently updated files. In one embodiment, the investigating further comprises ranking the active software components by how recently the active software components appeared on the computer system.

An embodiment of the invention also includes a computer readable medium having computer-executable instructions to perform acts for automatically identifying changes to files on a computer system, the acts comprising scanning the computer system for active software components, investigating file change histories for the active software components to find recently updated files, and searching a local file system for context information for the recently updated files.

Embodiments of the invention are used in a computer system executing a system restore operation that logs changes to files at restore points via a method of approximating the age of a file on the computer system, wherein a change to the file is logged by the system restore operation with respect to a first restore point, the method comprising setting a lower-bound for the age of the file as the time the first restore point was created setting an upper-bound for the age of the file as the time a second restore point was created and approximating the age of the file to be within the range of the upper-bound and lower-bound, wherein the second restore point immediately follows the first restore point sequentially.

A user interface is provided for assisting a computer user with troubleshooting software conflicts on a local computer, the user interface comprising a list of user selectable items including processes currently executing on the computer, wherein the list of user selectable items is sortable based on the time the items were last updated on the local computer. In one embodiment, selecting an item from the list causes context information about the item to be displayed. In another embodiment, the user interface further comprises a user selectable option to delete files associated with at least one of the user selectable items.

In accordance with an embodiment of the invention, a method of communicating between a computer troubleshooting module and a computer process is provided for use in a computer system including a system restore operation that logs changes to files at restore points, the method comprising receiving, from the computer process, a call having a plurality of parameters comprising a first time parameter, and issuing, by the troubleshooting module, a list of processes and modules active on the computer system, wherein the list of processes and modules is sorted by time last updated on the computer system relative to the first time parameter, and time last updated is determined by a method comprising investigating logs at system restore points.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 6 is a screenshot of an exemplary application for identifying changed files and resolving software conflicts, in accordance with an embodiment of the invention;

FIG. 7 is a screenshot of an exemplary application for displaying context information, in accordance with an embodiment of the invention.

DETAILED DESCRIPTION OF THE INVENTION

The methods and systems to identify changed files, resolve software conflicts and remove unwanted files will now be described with respect to preferred embodiments; however, the methods and systems of the present invention are not limited to changed file identification and software conflict resolution. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
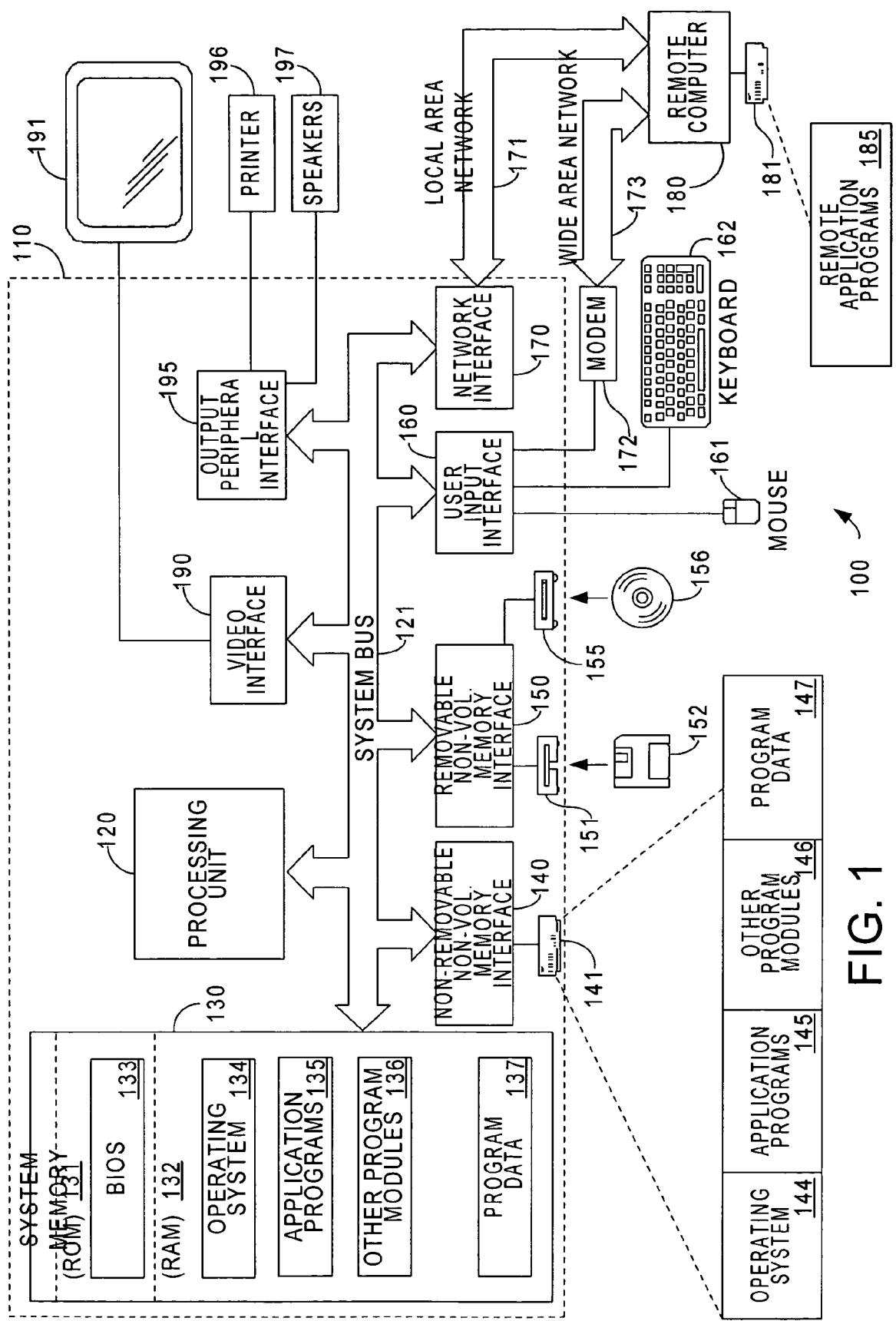
FIG. 1 is a simplified schematic illustrating an exemplary architecture of a computing device for carrying out changed file identification, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
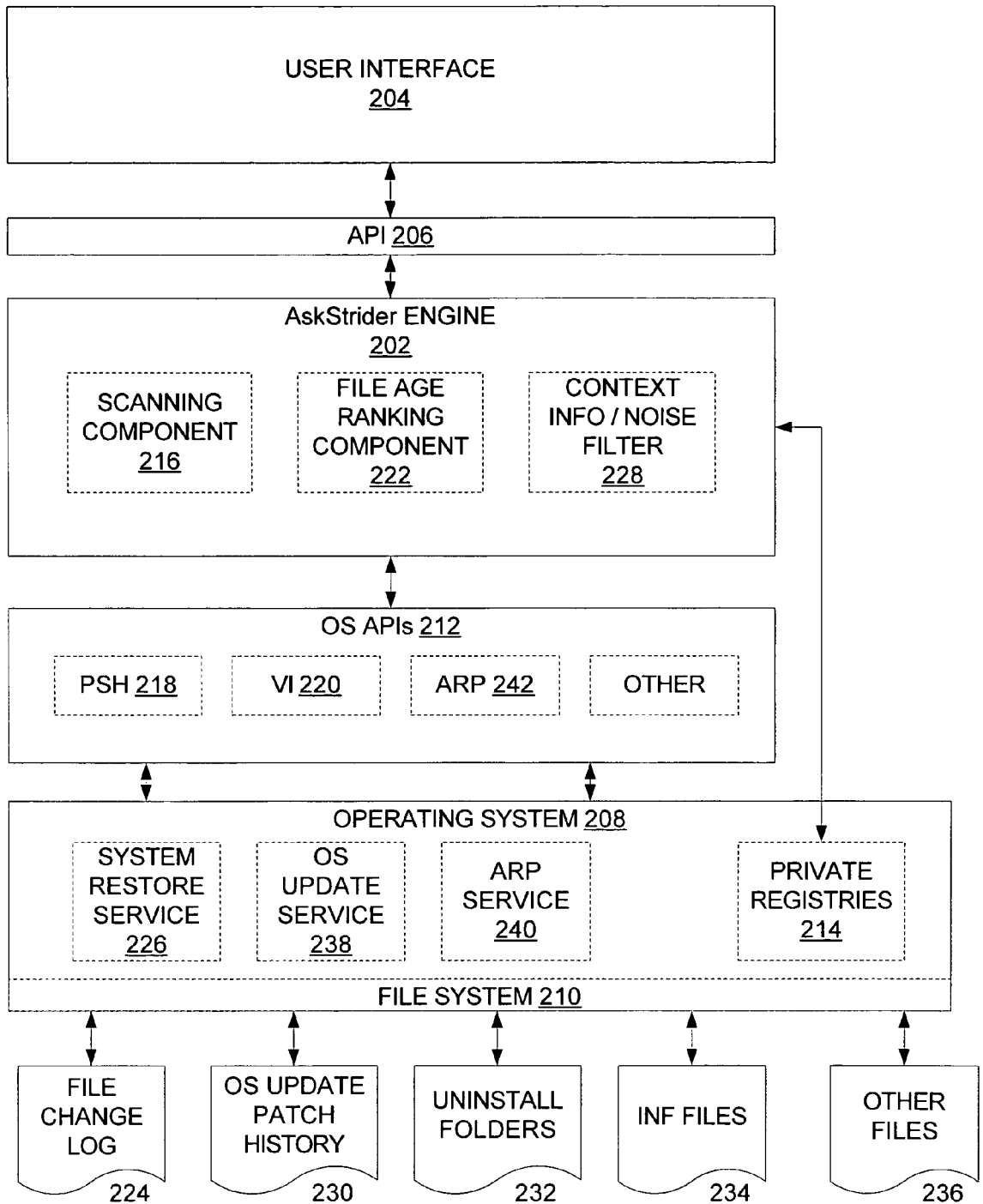
FIG. 2 is an illustration of a component architecture used for identifying changed files in a system, in accordance with an embodiment of the invention.

In an embodiment of the invention, a software tool, called AskStrider, is used to help users answer the question of "what has changed on my machine lately" and to help them understand the impact of those changes. A component architecture in which the tool operates is shown in FIG. 2, in accordance with an embodiment of the invention. An AskStrider software engine 202 performs several troubleshooting functions through its several components. A user interface 204 allows a user to interact with the AskStrider engine 202, preferably through intermediary calls to an application programming interface (API) 206. The user interface 204 is either a standalone application, a web-based control, a command-line interface, etc. The API further permits other troubleshooting applications to access the functionality of the AskStrider engine 202. The AskStrider engine 202 operates by gathering information from the operating system 208 and from data files accessed via the file system 210. The AskStrider engine 202 communicates with the operating system 208 through several public OS APIs 212 or by directly accessing private OS registries 214.

In greater detail, a scanning component 216 of the AskStrider engine 202 scans the operating system 208 for active components such as processes, modules and device drivers. The scanning component 216 looks up associated files to obtain more detailed and/or user-friendly information such as version, description, company, etc. In an embodiment of the invention, the scanning component 216 performs its scan by querying the operating system 208 through OS APIs 212, such as Process Status Helper 218 and Version Information 220 APIs.

A file age ranking component 222 queries the operating system 208 and file system 210 to determine the age of files associated with the active components. The file age ranking component 222 accesses a file change log 224. The file change log 224 is a file or collection of files modified by a system restore service 226 of the operating system 208. The system restore service 226 saves pre-images of files immediately prior to their modification, or it creates a log-file record 224 prior to creating a new file. Alternatively, the system restore service 226 periodically logs changes to various system files in the file change log 224, to allow for the system to be restored to a previous state. A description of an exemplary system restore service as used in an embodiment of the invention is given by Harder in Microsoft Windows XP System Restore, April 2001, found at http://msdn.microsoft.com/library/en-us/dnwxp/html/windowsxpsystemrestore.asp, which is hereby incorporated by reference in its entirety for all that it teaches without exclusion of any part thereof.

A context information and noise filtering component 228 gathers additional information from the file system 210 to provide context information regarding the active processes, modules, drivers, etc. and to suppress information not necessary to helping the user's troubleshooting experience. The context information component 228 accesses OS update patch history files 230, uninstall folders 230, INF files 234 and other files 236. The OS update patch history files 230 are preferably XML files created by an OS update service 238 that updates operating system files to current versions by applying software patches as needed. The uninstall folders 232 are maintained by the OS update service 238 and contain a list of files updated by an OS update patch, to allow applied software patches to be removed from the operating system 208. INF files 234 are similar to uninstall folders, but particular to certain application update patches, such as MICROSOFT INTERNET EXPLORER. Other files 236 contain patch history information for other applications.

Additionally, an embodiment of the invention permits a user to cause files to be removed from the computer through the AskStrider engine 202. The AskStrider engine 202 interacts with an Add/Remove Program (ARP) service 240, preferably by calling an ARP API 242.

Embodiments of the invention allow access to the AskStrider engine through a variety of methods, including: with a command line tool, whereby AskStrider produces an XML output file that captures process/module dependencies in a hierarchical fashion; with an ActiveX control for Web access, whereby an interface displays the list of processes in the top pane and the list of modules loaded by the selected process in the bottom pane; with available software, such as Windows Task Manager, via an extension, whereby the available software's interface adds the two panes below the regular display area of process statistics. An example of an XML file produced by a command line interface to AskStrider is shown in Table 1.

TABLE 1

```
<?xml version="1.0"?>
<root>
    <processes>
        <number_of_processes>2</number_of_processes>
        <process pid="3484">
            <instance>
                <instance_name>NOTEPAD.EXE</instance_name>
                <cmdline>c:\docume~1\notepad.exe</cmdline>
                <parent pid="2840">
                    <instance_name>cmd.exe</instance_name>
                </parent>
                <full_path>C:\DOCUMENTS AND SETTINGS\NOTEPAD.EXE</full_path>
                <description>Notepad</description>
                <company>Microsoft Corporation</company>
            </instance>
            <modules>
                <module_info>
                    <name>RPCRT4.dll</name>
                    <full_path>C:\WINDOWS\SYSTEM32\RPCRT4.DLL</full_path>
                    <update_ts>09-10-2003 22:13:20</update_ts>
                    <install_info>Installed Windows XP KB824146.</install_info>
                    <version>5.1.2600.1254 (xpsp2.030801-1834)</version>
                    <description>Remote Procedure Call Runtime</description>
                    <company>Microsoft Corporation</company>
                    <size>532480</size>
                </module_info>
            </modules>
            <ipc>
            </ipc>
        </process>
    </processes>
</root>
```

The AskStrider API 206 preferably takes two parameters: the first one defines the number of days considered to be "recent"; the second one defines the number of days considered to be "most recent". When invoked, the API implementation scans the active process list, retrieves the list of loaded modules by each process, checks each module against the System Restore file change log to determine its "recent", "most recent", or "not recent" status, and sorts the module lists and the process list by the latest modification timestamps.

Figure 3:
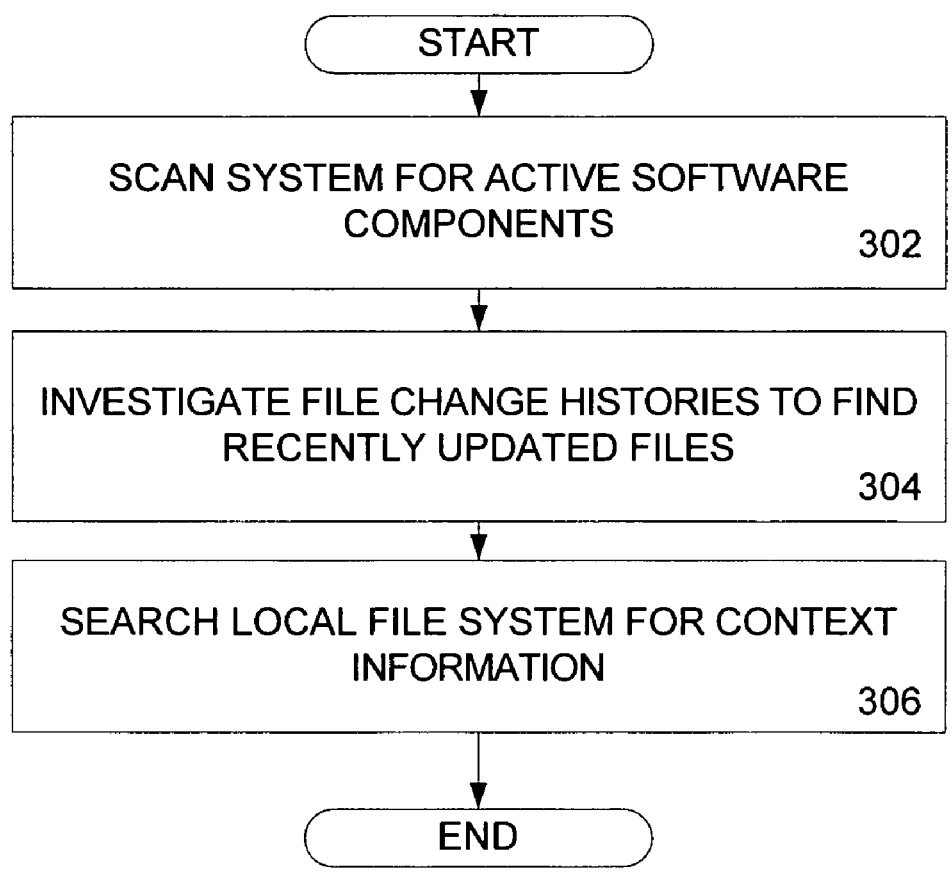
FIG. 3 is a flow diagram illustrating a method for identifying changed files on a computer system, in accordance with an embodiment of the invention.

An embodiment of AskStrider is substantially automatic, and its basic operation is shown in FIG. 3. It starts by scanning the system for active processes, libraries, drivers, etc., and their run-time dependencies at scanning step 302. Then, at step 304, it queries the file change history (maintained by System Restore [SR] on machines running the MICROSOFT WINDOWS XP operating system) and ranks the active components by how recent their corresponding files appeared on the machine so that "young" components are highlighted. Further, it searches the local file system at step 306 for context information for each recently updated file, such as which patch or software package a DLL came from, which device a driver file is used for, etc., so that the information becomes actionable by the users.

As noted above, embodiments of the invention consist of three main components: scanning for active components, ranking based on file age, and searching for context information. In the first step 302, the program queries the operating system for all the running processes and their loaded modules, and all the device drivers currently loaded by the system. Then it looks up the file associated with each such active component to obtain more detailed and/or user-friendly information such as version, description, company, etc.

On machines running the MICROSOFT WINDOWS operating system, these queries are performed by invoking the Process Status Helper and Version Information API functions. For example, for process "MsnMsgr.exe", AskStrider shows that its full path name is "C:\Program Files\MSN Messenger\MsnMsgr.exe", and one of its loaded modules is "C:\Program Files\Microsoft Firewall Client\wspwsp.dll" with a version "3.0" and a description "Microsoft WinSock Proxy WS2.0 provider".

Multiple process instances with the same name require additional information to tell them apart. For generic host processes such as svchost.exe and rundll32.exe, the program queries the operating system registries to obtain additional "CmdLine" information, which includes the command-line switches and input that were used to start each process. For example, there are usually four svchost.exe processes on a machine. The CmdLine information can distinguish them as C:\WINDOWS\system32\svchost.exe -k rpcss, -k netsvcs, -k NetworkService, and -k LocalService, respectively. Optionally, additional "Services" information can list all the Win32 services that are running inside each svchost.exe.

As another example, on the MICROSOFT WINDOWS operating system, the three different actions Control Panel→Add or Remove Programs, →AP Monitor, and →Firewall Client would launch three processes with the same name rundll32.exe, which is a generic host process for running a DLL as an application. The CmdLine information can clearly associate each of the processes with its corresponding UI window. Alternatively, the caption information of the window owned by each process is used to distinguish them.

Command prompt windows cmd.exe and Microsoft Internet Explorer (IE) browser windows iexplore.exe are another two common examples of multiple instances with the same name. For cmd.exe processes, additional "Current Directory" information is used to distinguish them. For iexplore.exe processes, since multiple browser windows opened through File→New→Window belong to the same process, the program uses the concatenation of the captions of these windows to differentiate among multiple iexplore.exe processes.

In the second step 304, the program queries the operating system for the age of each file associated with an active component. Then it computes the age of each process and use that to sort the process list, with the youngest process at the top. The module list is similarly sorted.

The following definitions are used throughout this application: on a per-machine basis, the age of a file is the elapsed time since the file was last updated on the machine. The age of a module instantiated from a file is equal to the age of the file. The age of a process is the lowest age among the modules loaded by the process. The age of the System process is the lowest age among the driver modules that are currently loaded.

One known approach to calculating file ages is to use the creation or modification file timestamps. However, the "Created" and "Modified" file timestamps on MICROSOFT WINDOWS operated machines may not provide reliable information of when a file was last updated on the local machine. For example, a system DLL that comes with a patch usually has those two timestamps permanently tied to the software development process, independent of when the patch was applied to each individual machine.

To obtain reliable file age information on a given machine, AskStrider queries the file change log of the System Restore service. System Restore uses a file system filter driver to monitor and log update operations made to files with selective extensions [SRM], which include all the "program" (i.e., non-data) file extensions and so suffice for our purpose. Whenever necessary, System Restore saves a copy of the to-be-modified file in the sub-folder under C:\System Volume Information that represents the latest restore point. Such pre-images are used at rollback time to restore the "program portion" of the file system.

Figure 4:
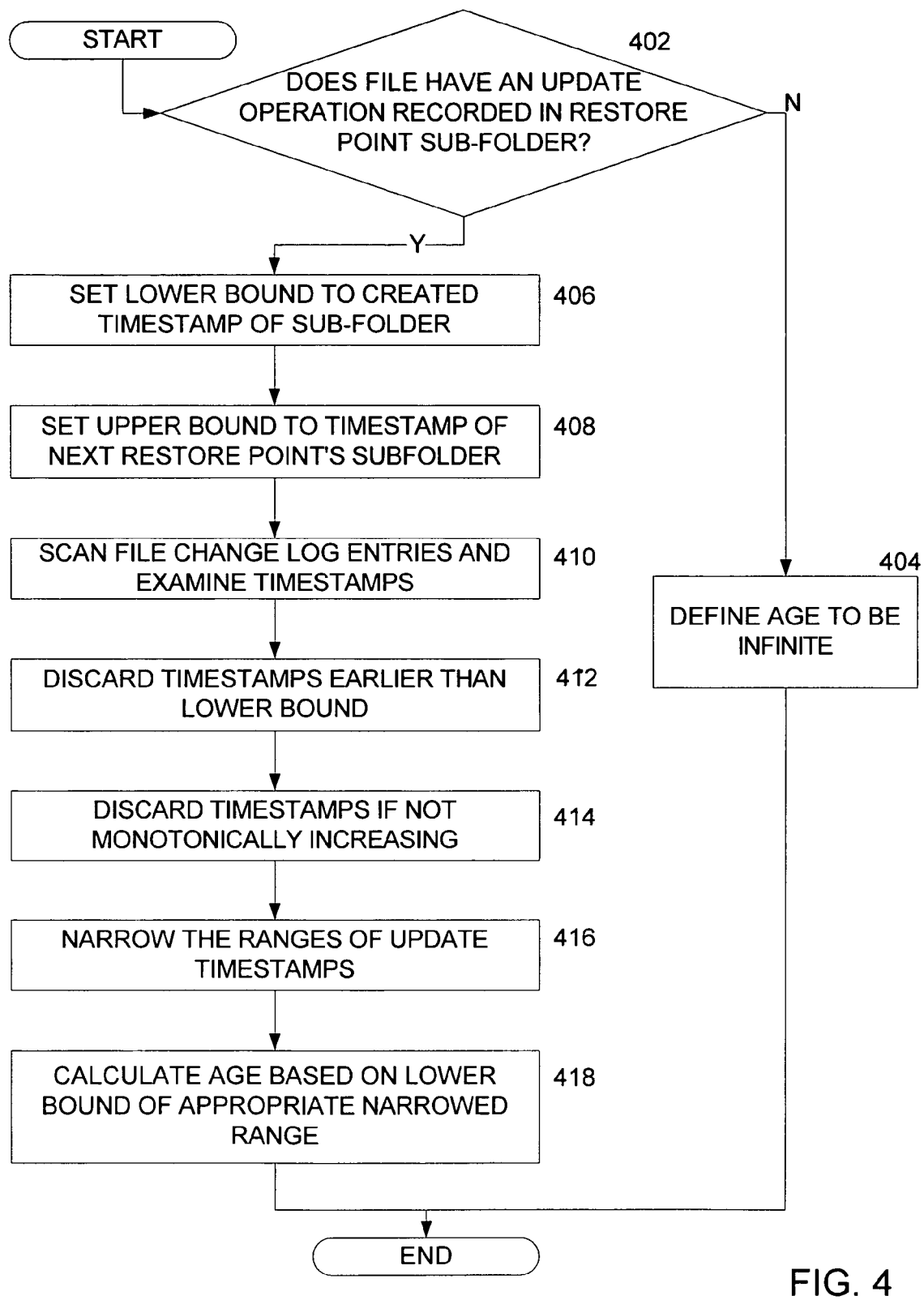
FIG. 4 is a flow diagram illustrating a method for calculating the age of files on a computer system, in accordance with an embodiment of the invention.

Unfortunately, System Restore does not maintain the timestamp for each individual logged file update operation. Since the Created and Modified file timestamps of the pre-images may not correctly reflect the update timestamps, AskStrider uses the algorithm described in FIG. 4 to calculate approximate file ages. First, a file is checked to see if it has update operations recorded in a restore point sub-folder at step 402. If not, the file's age is defined to be infinite at step 404. Otherwise, the file's update timestamp is lower-bounded by the Created timestamp of the sub-folder at step 406, and upper-bounded by the timestamp of the next restore point's sub-folder at step 408. Since System Restore typically creates a restore point every 24 hours if no manual or program-initiated restore points have been taken, this provides a minimum resolution of 24 hours for file update timestamps.

Second, to provide a finer granularity for update timestamps, AskStrider scans the entries in the file change log of each sub-folder in their recorded sequence and examines the timestamps of their corresponding pre-image files, if available, at step 410. Timestamps that are earlier than the sub-folder creation time are discarded at step 412 because they cannot possibly reflect the actual update times. Timestamps that are not monotonically increasing are also discarded at step 414. The remaining ones are used to provide narrower ranges for update timestamps at step 416. Moreover, the Created timestamps of those folders that have a corresponding "folder creation operation" log entry can often provide additional timestamps.

Lastly, the age of any file that has been updated at least once since the earliest available restore checkpoint is calculated at step 418 based on the lower-bound timestamp of the range for the latest update. The age of all other files is defined to be infinite at step 404. A high-level pseudocode for the method is given in Table 2.

TABLE 2

```
For each restore point {
LatestTimestampSeen = CreateTimeStampOf(change.log)
MaxUpperboundTimestamp = WriteTimeStampOf(change.log)
For each entry in unresolved_upperbound_cache {
      UpdatedFile.UpperboundTimestamp = CreateTimeStampOf(change.log)
}
For each entry in the changelog {
      If(entry has a backed up file) {
            FileTimestamp = TimeStampOf(backed up file);
            If    (FileTimestamp    >    LatestTimestampSeen    and    <
MaxUpperboundTimestamp) {
                  LatestTimestampSeen = FileTimestamp;
                  For each entry in unresolved_upperbound_cache {
                  UpdatedFile.UpperboundTimestamp     =     CreateTimeStampOf
(change.log)
            }
      }
      If(interested in the updated file) {
            UpdatedFile.LowerboundTimestamp = LatestTimestampSeen;
               Add file to unresolved upperbound timestamp cache
      }
   }
}
```

In addition to the above-described method that calculates "file ages" by the elapsed time since the file was last updated on the target machine, an embodiment of the invention further calculates file age by subtracting from that elapsed time those periods of time when the machine was turned off; the file was definitely not used during those periods and so should not age. For example, suppose the machine is turned off right after a file is updated. When the machine is turned on again for the first time one week later, the file age should be close to zero instead of one week.

Another method of calculating file age, as used in an embodiment of the invention, is to determine the number of times a file has been used since the file was last updated—a file should not age if it is never used even if the machine has always been on. This technique requires an always-on tracing infrastructure. Still another method of calculating file age combines this technique with determining the number of processes that have used the file—a file may break App #2 when the app reads the file for the first time, even if App #1 already used the file a thousand times.

Figure 5:
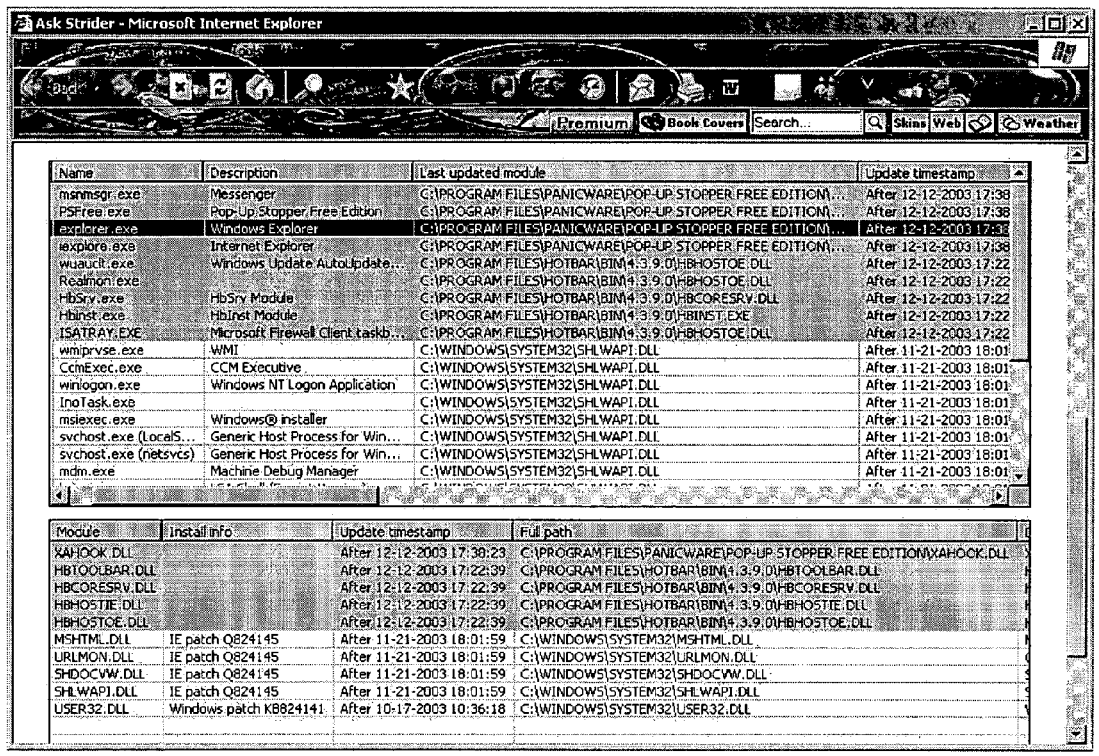
FIG. 5 is a screenshot of an exemplary application for identifying changed files and resolving software conflicts, in accordance with an embodiment of the invention.

Embodiments of the invention also use the calculated file age to rank files for display. A sample screenshot from an implementation of AskStrider, in accordance with an embodiment of the invention, is shown in FIG. 5. The display in FIG. 5 is a web-based interface to the AskStrider engine. The image at the top of the browser window was due to a "drive-by download" of Hotbar, a program that places images within the user-interface panes of browser windows. In this case, AskStrider highlights Hotbar and Pop-up Stopper as two recent additions to the machine. Generally, the display of processes and modules in AskStrider is ordered by their ages. In the top pane of process list, "younger" processes are displayed closer to the top. The bottom pane lists modules for the selected process, with younger modules displayed first. Modules are dynamic linked library (DLL) files, .OCX files, .SYS files, etc. To further highlight recent changes to the system, processes and modules that are younger than one week are highlighted in color; those with an infinite age are displayed in a separate pane that shows up only through a right-click menu selection.

The appearance of the AskStrider display naturally represents the "stability" of the system: if there has not been any update for a long time, both panes will contain only a small number of entries and none of them will be color-highlighted, which signifies that the system is stable. In contrast, if any of the widely shared OS components has been recently updated by a patch, the top pane will show a large number of highlighted young processes, which suggests that the system may be unstable. As time goes by, those processes will age and eventually disappear from the top pane.

In some scenarios, the highlighted processes and modules alone provide sufficient information on what the user should do or investigate next. For example, they may reveal the name of the application that the user should try to uninstall to fix the problem. In other scenarios (some described in the next section), additional context information is required to make the displayed results actionable. By selecting an individual process or module, the user is presented with context information regarding that item. For example, selecting a process in the top pane leads to "drill-down information" of the list of loaded module in the bottom pane; double-clicking on a module in the bottom pane brings up the list of files that were updated around the same time to give more context information. Thus, in the third step 306, AskStrider gathers such context information from the local file system.

Figure 6:
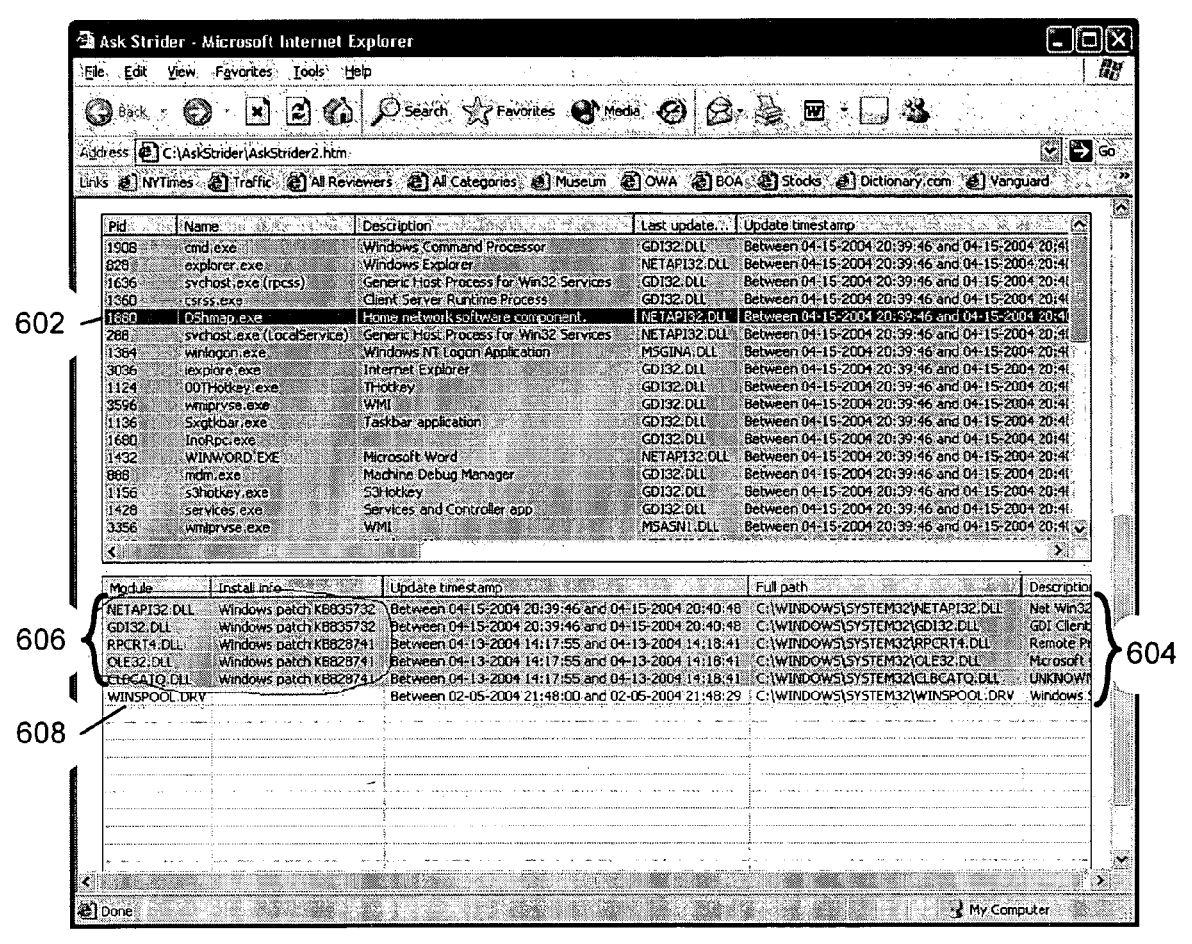
Figure 7:
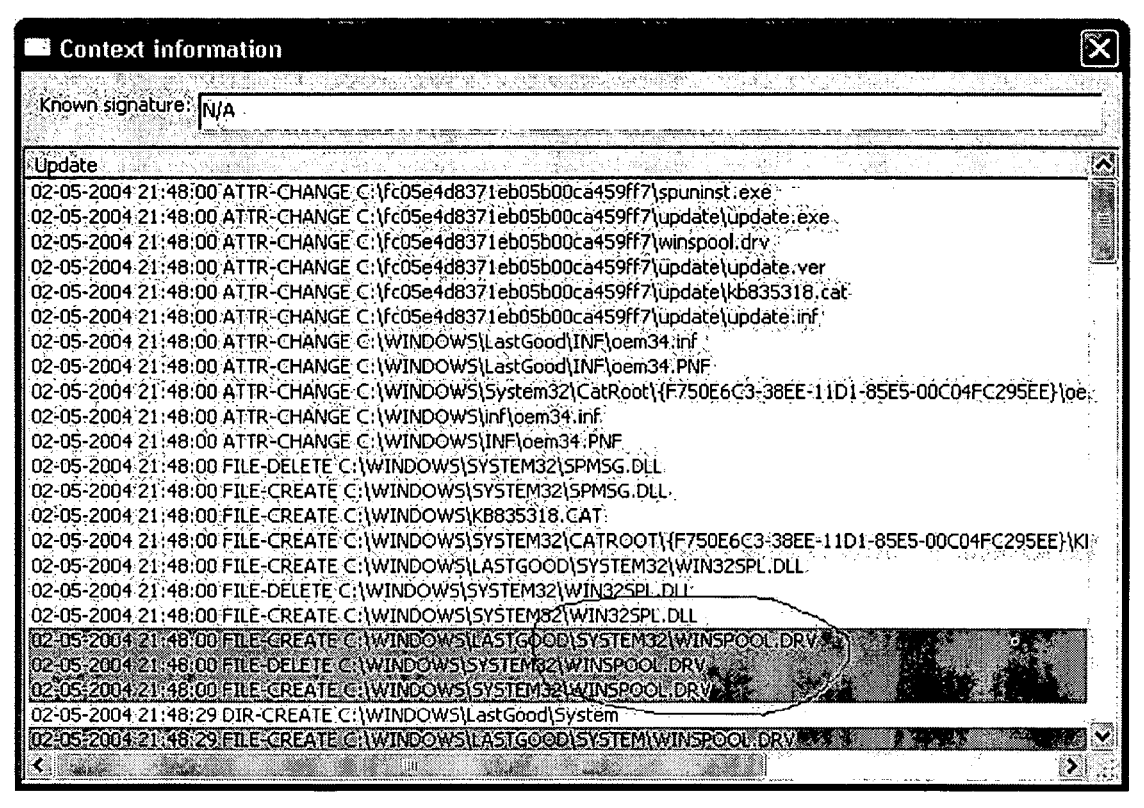

An exemplary usage of displaying context information, as used in an embodiment of the invention, is shown in FIG. 6 and FIG. 7 with respect to patch information mapping. Patch information mapping is one method used by embodiments of the invention to provide context information. If an application stops working after several patches are applied, it is important for the user to find out whether any of the patches may be responsible and, if so, which one. Many patches today do not provide a well-documented manifest file that specifies the list of target files and versions. Even for those critical security patches that do provide such a manifest in, for example, the mssecure.xml file that is downloaded as part of the Microsoft Baseline Security Analyzer [MBSA], some of the target files may not be updated on certain machines because they may have already acquired the right versions of those files from other patches.

Fortunately, many important patches back up the replaced files to allow selective removal of patches. The approach of AskStrider is to query those backed up information on the local machine to determine which patch was the last one to update a particular file and when. For MICROSOFT WIN- DOWS OS patches, AskStrider searches through the C:\Windows\$NtUninstall . . . $ folders and the Windows Update patch history XML file on the local machine. For MICROSOFT INTERNET EXPLORER patches, the program queries related Registry entries and parses the patch INF files under the C:\Windows\inf directory. Additional mapping information is implemented for other applications such as Microsoft Office, SQL, etc. patches.

Turning in detail to the example of FIG. 6, a process "DShmap" 602 is highlighted in the top pane of the AskStrider interface. Corresponding context information for the highlighted process 602 is shown in the bottom pane, including modules 604. Several of these modules 606 are DLL files and have source patch installation information displayed alongside. Another module, "WINSPOOL.DRV" 608 did not come from a patch for which the AskStrider engine can extract context information. When the user double-clicks the WINSPOOL.DRV 608 module from the lower pane, he is presented with an additional context information window, as shown in FIG. 7. The highlighted entries in the window of FIG. 7 show approximate file update timestamps corresponding to the selected module.

Another method used by embodiments of the invention to provide context information is change log-based grouping. In many current operating systems, software installation programs are not obligated to specify the set of all programs that they install, to provide an uninstall option, or to cleanly remove all installed components upon removal. When an application is partially uninstalled, it can be very difficult for the users to determine which application a left-over module belongs to. For example, an application ABC may install most of its programs in C:\Program Files\ABC, but also install some DLLs under C:\Program Files\Common Files and some drivers under C:\Windows\System32. Suppose the software removal program removes C:\Program Files\ABC. The left-over DLLs and drivers then become orphans that give users little information on where they came from.

Fortunately, the proximity of file update operations in the System Restore file change log provides an opportunity for heuristic application grouping. Specifically, if a recently updated file does not belong to any known applied patch, AskStrider queries the file change log for other files that were updated around the same time and tries to deduce the name of the application to which the file potentially belongs. Sometimes, installation programs that are System Restore-aware take a restore point before an installation begins and write an informative string (such as "Installed Windows Messenger 5.0") as the description for the restore point, which AskStrider can extract as useful context information. Embodiments of the invention further make use of additional information stored in the file change log, such as actual timestamps, and identifying the particular processes that performed the actions.

Still another method used by embodiments of the invention to provide context information is to couple device and driver information. Experience with extracting driver information shows that the description associated with a driver file sometimes does not provide useful information to the user. For example, the file wlluc48.sys on a laptop has a generic description of "NDIS 5.1 Miniport Driver" and the file cmbp0wdm.sys has a cryptic description of "PC/SC IFD handler for CardMan 4000". Driver-to-device mapping is preferably performed by first enumerating the devices maintained by the operating system (such as by the Device Manager in MICROSOFT WINDOWS), using, for example, an API to the operating system such as SetupDiGetClassDevsEx. The INF file for the device used during install is parsed to determine the files that were copied (using, for example, the SetupOpenFileQueue and SetupScanFileQueue function calls in MICROSOFT WINDOWS).

To provide more friendly information to the users, AskStrider identifies the device that a driver is used for, whenever possible, and augments the driver file information with the device description. For example, wlluc48.sys is used for "Toshiba Wireless LAN Mini PCI Card" and cmbp0wdm.sys is used for "Omnikey AG CardMan 4000 PCMCIA Smart Card Reader". Such information is more useful for users to understand the purpose of the drivers and to troubleshoot problems.

In an embodiment of the invention, the techniques of analyzing the change log, described above, are further combined with the above-described context information searching techniques in a single, comprehensive and reusable Context Information component 228. Given a process or a file, the component answers the following key questions: What is it? How does it get instantiated? (That is, through which extensibility mechanism?) Where was it installed? When was it installed? Who installed it? How can I get rid of it, and everything that came with it? The Context Information component becomes a component of a general system management and troubleshooting application. It can potentially extract more context information from other sources; for example, event logs may contain interesting information about change events such as hardware changes, etc.

If the AskStrider engine returns such a large number of processes as to overwhelm the user, an embodiment of the invention provides a "noise filtering" sub-component to allow the users to suppress most of the output. The embodiment provides a "trusted company list" mechanism through which the users can specify the companies that they trust. By asking AskStrider to suppress the display of those files that came from companies on the list, the user is presented with a display of only those files that came from "non-trusted" companies. This mechanism can be based, for example, on the Description field of the files (which can be forged) or digital signatures. An embodiment also pre-computes a hash of each of the operating system executable files, patch files, and other "known good" application files. The program uses the list of hashes to match against the files output by AskStrider and suppress them from the display.

An implementation of AskStrider coordinates with the Add/Remove Programs functionality of the MICROSOFT WINDOWS OS. The program searches the Registry to see if there is an Add/Remove Programs entry associated with a displayed module (based on sub-string match, update timestamps, etc) and puts a Remove button there accordingly. The user can thereby remove the module by clicking the Remove button in a one-step process.

In one embodiment of the invention the information contained in the System Restore files is secured via encryption/digital rights management, or by a combination of hardware and software.

Several examples are now given in which embodiments of the invention are used to aid the user in troubleshooting. The first category of examples are unwanted software commonly referred to as "Drive-by Downloads", "Spyware", and "Snoopware". Detection of unwanted software is typically done through a signature-based approach; examples include anti-virus software and AD-AWARE spyware detection software [AA]. However, the proliferation of different types of unwanted software and their variants make it difficult for the signature-based approach to always have an up-to-date, complete coverage.

Embodiments of the invention provide a complementary approach by identifying all unwanted software in a uniform way. It helps speed up the discovery and reporting of unwanted software and hence the update of signatures. Since AskStrider typically takes only 5 to 45 seconds to scan a system, it can be invoked, for instance, every morning when a user comes to work or every night when a user finishes her browsing activities; if anything suspicious shows up, more thorough signature-based scanning can follow. (In contrast, a full scan using AD-AWARE on a laptop with a 40 GB disk takes about seven minutes.)

On machines running the MICROSOFT WINDOWS operating system, the default Internet-zone security setting of the IE browser is set to Medium to protect user machines against unauthorized download of ActiveX controls. But many users change it to Low to avoid getting security warning dialog boxes and broken displays at certain Web sites. By doing so, however, the users allow "drive-by downloads"; that is, ActiveX controls can be downloaded and installed on the machines without explicit consent from the users. Later on, if the users suspect that such software may be responsible for serious machine performance degradation or unreliability, it is in general very difficult for them to even know what software has been installed. For example, drive-by downloading happens when a browser with Low security setting is directed to a particular website called "Hotbar" that causes code to be automatically downloaded, even if the user clicks the "No" button on the dialog box. After a while, it will make the top of the IE and Control Panel windows look like the cover of a romance novel (see FIG. 5). It will also monitor browsing activities and serve pop-up ads.

By invoking AskStrider, a user can clearly see one or two new processes appear near the top, which are instantiated from newly installed EXE files under C:\Program Files\Hotbar. Other processes such as IE, Explorer, Outlook, Instant Messenger, and Word, etc. also appear near the top because five DLLs from that same directory have been injected into these processes in various combinations. In this case, the company has kindly provided an uninstallation option at Control Panel→Add or Remove Programs. Once the user identifies that the installed software was from Hotbar, she can remove the software and then re-run AskStrider to make sure that it is indeed no longer running.

Figure 8:
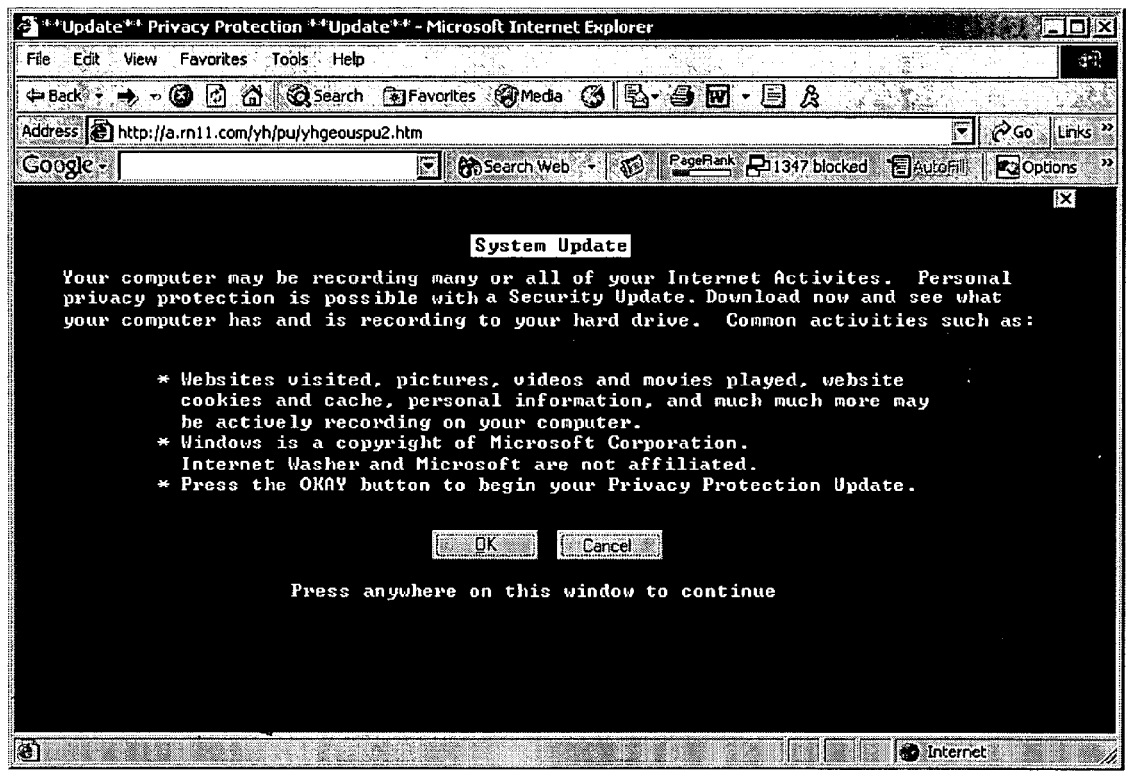
FIG. 8 is a screenshot of a website that fools users into downloading unwanted software onto a computer system.

Unauthorized download can also happen when a user clicks on a pop-up window that has a serious blue-screen look with a "System Update" title, as shown in FIG. 8. The download of a program called "Internet Washer" will begin even if the user clicks the "Cancel" button, which is in fact a fake button superimposed onto an image. AskStrider shows that a new process C:\Program Files\Internet Washer Pro\iw.exe is started and two new DLLs C:\Program Files\Httper\Httper.dll and C:\Program Files\Zipclix\Zipclix.dll are loaded into every IE process. By going through Add or Remove Programs and looking for these names, the user can try to uninstall these three applications. However, the uninstallation in this case simply removed the entries from Add or Remove Programs list, but left the software running, thus requiring subsequent user intervention to remove the programs. Without the information from AskStrider, the user would have no idea of what files to look for. Furthermore, many users would be uncomfortable removing an application disguised under a name like "Httper", which makes it look like an OS component, when it actually is potentially malicious software deposited on the user's machine.

Another example in which embodiments of the invention aid in troubleshooting is PRECISION TIME [PT] software. PT is software that synchronizes a computer's clock with the U.S. Atomic Clock. Users can obtain the software for free but, in return, they allow the providing company to deliver pop-up ads based on their online surfing behavior. Invoking AskStrider several minutes after the installation of Precision Time reveals that four new processes were started and two DLLs were injected into every IE process. The software provides an uninstallation option at Add or Remove Programs, but it does not always work. In one trial, AskStrider showed that three of the processes were left running after an unclean uninstallation (followed by a reboot) without any error message. A spyware removal program was eventually used to remove those left-over components.

Embodiments of the invention also aid in the detection and removal of snoopware, which can covertly be installed on a local or remote machine to record keystrokes and screenshots. In one trial, invoking AskStrider after the installation of such snoopware revealed that a new process named wsys.exe was started and a new DLL named wsys.dll was injected into most of the processes. It would have been very difficult to identify these two components were it not for the file age-based ranking of AskStrider because of the way the two files were named and because they were both placed into the C:\Windows\System32 directory, making them appear to be legitimate files of the operating system.

Other snoopware records to a log file the visited URLs, typed text in email, chat, and other applications, programs user runs, etc. and silently emails the log file when the computer goes online. In one trial, AskStrider similarly showed that a new process was started and a new DLL was injected into many other processes. The full path name revealed by AskStrider identified the DLL with the snoopware program.

More generally, embodiments of the invention aid in the detection and removal of conflict-causing software by combining process/module dependency tracking, file age-based process and module ranking, and file-to-patch mapping. Once a conflict has been identified, the information provided by AskStrider can be used to search support databases with increased specificity. Also, AskStrider can easily detect unclean uninstallations, which commonly mislead users and support engineers in their troubleshooting efforts.

As another example, invoking AskStrider on a machine revealed that a new driver called CdaC15BA.SYS and a new process called CDAC11BA.EXE were running, and both were installed into the C:\Windows\System32\drivers directory. The driver file did not give any information and the EXE file only indicated that it was from a company named "Macrovision". The context information, however, showed that these two files were created around the same time when many files were created under a particular directory, and when a folder called C:\C_DILLA\SafeCast Product Licenses was updated. A Web search based on those information revealed that a particular commercial software application, which had been recently installed and uninstalled, additionally installed the C-Dilla product license protection software without user knowledge, and that software was left running even after the commercial application was uninstalled.

Embodiments of the invention are further useful in identifying unknown disk activity. A common performance problem is that some unknown application causes a lot of disk activities for no apparent reason, thereby degrading machine performance tremendously. With prior systems, it was very difficult for the user to identify the root cause. With AskStrider, the user can identify those processes that have an abnormally high rate of I/O calls and invoke the Context Information component to give the user a better idea of what those processes are for. Combining that with file tracing, the user can even identify which files those processes are reading from or writing to.

A further embodiment of the invention is a next-generation Software Installation Management (SIM) Console. The SIM console is similar to AskStrider, but differs in that, while AskStrider starts with scanning of actively running processes and modules, the SIM console deals with files that came from software installations and may not be currently active.

In an embodiment of the invention, the SIM provides the option of sorting software packages according to their installation dates. By correlating the update timestamps of and Display Name information under the ARP Registry sub-keys with the update timestamps and updated files' names in the System Restore file change log, the SIM estimates the installation times of recently installed software packages that have ARP entries and uses those to rank the ARP display so that the most recent installation appears at the top.

The SIM further catches "bad-citizen" software packages that are trying to hide (e.g., spyware) and so do not provide ARP entries. The SIM automatically creates ARP entries for those software that "hook" auto-start-upon-reboot or auto-start-upon-login OS extensibility points or the various Internet Explorer (IE) browser extensibility points such as Browser Helper Objects, Toolbars, search sites, Plug-ins, etc. Software that hook these extensibility points have the most impact on user experience because they can be started without users explicitly running them. A partial list of extensibility points in a MICROSOFT WINDOWS environment are shown in Table 1.

software from being automatically started. Clean-up can be performed later on through periodic spyware scanning of the entire file system. The "Zap" button is also provided for all "hooking" components that do not provide a "Remove" option. Additionally, an embodiment further provides an error reporting mechanism that allows users to report "bad" applications that either do not provide a "Remove" option upon installation or do not cleanly remove all components upon uninstallation. This mechanism allows the user community to collectively identify such bad applications; otherwise, the providers of such applications could intentionally fail to provide a robust "Remove" operation and simply blame the anecdotal reports of such failures on each machine's configuration peculiarity.

For each installed software package, an embodiment of the invention provides a "What's this?" button for the user to retrieve more context information about the package. Pressing the button invokes the AskStrider Context Information component and display answers to the questions mentioned above, if available. For example, it may show that spyware B was probably secretly installed by another spyware A that the user has since uninstalled; in this case, the user may want to uninstall the left-over B. In contrast, it may show that spyware C was probably installed by a freeware F that the user is still using; in this case, the user should probably keep C if it's required by the End User License Agreement that came with the freeware. The context information retrieved in response to pressing the "What's this?" button can be obtained, for example, from existing spyware signature files, the Internet, or the local file system.

TABLE 1 k:HKLM\SOFTWARE\Microsoft\Windows\CurrentVersion\Run
k:HKLM\SOFTWARE\Microsoft\Windows\CurrentVersion\RunOnce
k:HKLM\SOFTWARE\Microsoft\Windows\CurrentVersion\RunOnceEx
k:HKLM\SOFTWARE\Microsoft\Windows\CurrentVersion\RunServices
k:HKLM\SOFTWARE\Microsoft\Windows\CurrentVersion\RunServicesOnce
k:HKLM\SOFTWARE\Policies\Microsoft\Windows\System\Scripts
k:HKLM\SOFTWARE\Microsoft\Windows\CurrentVersion\policies\Explorer\Run
k:HKLM\SOFTWARE\Microsoft\Windows\CurrentVersion\ShellServiceObjectDelayLoad
v:HKLM\SOFTWARE\Microsoft\Windows NT\CurrentVersion\Winlogon\Userinit
k:HKCU\Software\Microsoft\Windows\CurrentVersion\Run
k:HKCU\Software\Microsoft\Windows\CurrentVersion\RunOnce
k:HKCU\Software\Microsoft\Windows\CurrentVersion\RunOnceEx
k:HKCU\Software\Microsoft\Windows\CurrentVersion\RunServices
k:HKCU\Software\Microsoft\Windows\CurrentVersion\RunServicesOnce
k:HKCU\Software\Policies\Microsoft\Windows\System\Scripts
k:HKCU\Software\Microsoft\Windows\CurrentVersion\Policies\Explorer\Run
v:HKCU\Software\Microsoft\Windows NT\CurrentVersion\Windows\Run
v:HKCU\Software\Microsoft\Windows NT\CurrentVersion\Windows\Load
k:HKLM\Software\Microsoft\Internet Explorer\Toolbar
k:HKLM\Software\Microsoft\Internet Explorer\Extensions
k:HKLM\Software\Microsoft\Internet Explorer\AdvancedOptions
k:HKLM\Software\Microsoft\Windows\CurrentVersion\Explorer\Browser Helper Objects
k:HKLM\SOFTWARE\Microsoft\Code Store Database\Distribution Units
v:HKLM\SOFTWARE\Microsoft\Internet Explore\Search\SearchAssistant
k:HKLM\SYSTEM\CurrentControlSet\Control\Session Manager In order to catch those "bad-citizen" software packages that pretend to provide an ARP entry with a "Remove" option, which simply removes the ARP entry but leaves actual software running, an embodiment of the invention monitors the removal operation after the user hits the "Remove" button. If the ARP entry is removed but its corresponding Registry entries at the extensibility points and/or installed files remain, the SIM provides a "Zap" button for the user to remove the entries and the files (and sometimes unregister their associated COM components). This does not necessarily cleanly remove all components of the bad software, but it prevents the Alternatively, an embodiment provides an explicit "application grouping" mechanism that allows each application to add a tag to other applications that are installed together with it. Each freeware can then tag all the spyware that it installs with an EULA that requires the users to leave them installed as long as the freeware is still installed. Similarly, commercial software can tag copyright protection software that may be installed with it.

As an additional feature of the SIM, an embodiment of the invention allows users to choose to be notified as soon as any program tries to hook any of the extensibility points by monitoring all auto-start extensibility points for changes either through always-on Registry tracing or by registering to receive Registry change events. Upon detecting changes, the user is notified that some program is trying to hook these auto-start points. This can be implemented as one of the security settings that can be turned on and off.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method of automatically identifying changes to a computer system, comprising:
    scanning the computer system for all active software components;
    investigating a history of changes made to files associated with each of the active software components discovered during the scanning to find recently updated files, the investigating including:
        narrowing a time range when a file was updated regardless of inclusion of a time stamp for the respective file, the narrowing including:
            setting a lower-bound for the time range when a first restore point sub-folder was created;
            setting an upper-bound for the time range when a second restore point sub-folder was created;
            examining a recording sequence of pre-image timestamps in a file change log for each of the first restore point sub-folder and the second restore point sub-folder; and
            determining a narrowed time range for the file based on one or more of the examined pre-image timestamps, such that the narrowed time range is not bounded by the lower-bound and the upper-bound; and
        ranking each of the active software components by how recently the files were updated on the computer system.

2. The method of claim 1, wherein the first restore point sub-folder and the second restore point sub-folder are part of a system restore service.

3. The method of claim 1, further comprising grouping software components based on proximity in one of the file change logs.

4. The method of claim 1, further comprising deleting files associated with at least one of the active software components.

5. The method of claim 4, further comprising deleting all files associated with at least one of the active software components.

6. The method of claim 1, further comprising identifying a software patch conflicting with a software application.

7. The method of claim 1, further comprising discarding a pre-image timestamp in an event that it is earlier than the lower-bound.

8. The method of claim 1, further comprising discarding a pre-image timestamp in an event that it is not monotonically increasing.

9. The method of claim 1, further comprising adjusting an age of the file based on time periods when the computer system was not operational.

10. A computer readable storage medium having computer-executable instructions to perform acts for automatically identifying changes to files on a computer system, the acts comprising:
    scanning the computer system for all active software components;
    investigating a history of changes made to files associated with each of the active software components discovered during the scanning to find recently updated files, the investigating including:
        narrowing a time range when a file was updated, the narrowing including:
            setting a lower-bound for the time range when a first restore point sub-folder was created;
            setting an upper-bound for the time range when a second restore point sub-folder was created;
            examining pre-image timestamps in a file change log for each of the first restore point sub-folder and the second restore point sub-folder; and
            determining a narrowed time range for the file based on one or more of the examined pre-image timestamps; and
        ranking each of the active software components by how recently the files were updated on the computer system.

11. The one or more computer readable storage medium of claim 10, wherein the first restore point sub-folder and the second restore point sub-folder are part of a system restore service.

12. The one or more computer readable storage medium of claim 10, further comprising discarding a pre-image timestamp in an event that it is earlier than the lower-bound.

13. The one or more computer readable storage medium of claim 10, further comprising discarding a pre-image timestamp in an event that it is not monotonically increasing.

14. The one or more computer readable storage medium of claim 10, further comprising adjusting an age of the file based on time periods when the computer system was not operational.

15. A method
    of narrowing a time range when a file associated with an active software component of a computing system was updated, the method comprising:
        setting a lower-bound for the time range when a first restore point sub-folder was created;
        setting an upper-bound for the time range when a second restore point sub-folder was created;
        examining pre-image timestamps in a file change log for each of the first restore point sub-folder and the second restore point sub-folder; and
        determining a narrowed time range for the file based on one or more of the pre-image timestamps.

16. The method of claim 15, wherein the first restore point sub-folder and the second restore point sub-folder are part of a system restore service.

17. The method of claim 15, further comprising discarding a pre-image timestamp in an event that it is earlier than the lower-bound.

18. The method of claim 15, further comprising discarding a pre-image timestamp in an event that it is not monotonically increasing.

19. The method of claim 15, further comprising adjusting an age of the file based on time periods when the computer system was not operational.

* * * * *